(12) United States Patent
Ikegami

(10) Patent No.: US 11,606,413 B2
(45) Date of Patent: Mar. 14, 2023

(54) ESTIMATION APPARATUS, ESTIMATION METHOD AND PROGRAM

(71) Applicant: Nippon Telegraph and Telephone Corporation, Tokyo (JP)

(72) Inventor: Daisuke Ikegami, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 16/966,974

(22) PCT Filed: Feb. 1, 2019

(86) PCT No.: PCT/JP2019/003688
§ 371 (c)(1),
(2) Date: Aug. 3, 2020

(87) PCT Pub. No.: WO2019/156001
PCT Pub. Date: Aug. 15, 2019

(65) Prior Publication Data
US 2021/0051191 A1    Feb. 18, 2021

(30) Foreign Application Priority Data
Feb. 6, 2018  (JP) .............................. JP2018-019419

(51) Int. Cl.
*H04L 67/025* (2022.01)
*H04L 43/04* (2022.01)
(Continued)

(52) U.S. Cl.
CPC ............ *H04L 67/025* (2013.01); *H04L 43/04* (2013.01); *H04L 43/0888* (2013.01); *H04L 67/535* (2022.05)

(58) Field of Classification Search
CPC ... H04L 67/22; H04L 67/025; H04L 43/0888; H04L 43/04; H04L 43/08; H04L 43/16; H04L 65/80; H04L 67/535
See application file for complete search history.

(56) References Cited

U.S. PATENT DOCUMENTS 9,414,248 B2 * 8/2016 Kowali ................ H04W 24/04
2003/0221000 A1 * 11/2003 Cherkasova .......... H04L 67/125
709/224
(Continued)

OTHER PUBLICATIONS w3.org, [online], "Navigation Timing," Dec. 17, 2012, retrieved on Dec. 15, 2017, retrieved from URL<https://www.w3.org/TR/navigation-timing/>, 15 pages.

*Primary Examiner* — Glenton B Burgess
*Assistant Examiner* — Rachel J Hackenberg
(74) *Attorney, Agent, or Firm* — Fish & Richardson P.C.

(57) ABSTRACT

An estimation device includes: a collection unit configured to collect first information that has correlation with a display time of a web page from devices transmitting data in a network; a conversion unit configured to convert the first information into second information per unit time of each area including one of the devices; and a calculation unit configured to calculate an estimated value of the display time in each area in the unit time based on the second information and characteristics of the display time with regard to the first information. Thus, a display time of a web page is estimated from information which can be measured in a network.

18 Claims, 2 Drawing Sheets

(51) Int. Cl.
    *H04L 43/0888*    (2022.01)
    *H04L 67/50*      (2022.01)

(56) References Cited

U.S. PATENT DOCUMENTS

| | | | |
|---|---|---|---|
| 2003/0233445 A1* | 12/2003 | Levy | H04L 69/28 |
| | | | 709/224 |
| 2009/0100172 A1* | 4/2009 | Chen | G06F 11/3447 |
| | | | 709/224 |
| 2011/0119370 A1* | 5/2011 | Huang | H04L 43/14 |
| | | | 709/224 |
| 2013/0185643 A1* | 7/2013 | Greifeneder | H04L 67/22 |
| | | | 715/736 |
| 2015/0074177 A1* | 3/2015 | Yamamoto | H04L 43/0852 |
| | | | 709/203 |

\* cited by examiner ures a web waiting time required for an individual user to read a web page and monitor quality of a service provided by a communication network. In order to improve communication service quality, a network service provider can construct efficient equipment by making investment in equipment from an area with relatively poor provision quality. Therefore, a technology for estimating a web waiting time actually experienced by a user in units of areas is required.

In the related art, a navigation timing API (see Non-Patent Literature 1) capable of performing measurement on a terminal has been used to ascertain a web waiting time. In this API, a web waiting time is estimated by acquiring each timing at which a web page is read from a browser.

ESTIMATION APPARATUS, ESTIMATION METHOD AND PROGRAM

CROSS-REFERENCE TO RELATED APPLICATIONS

This application is a National Stage application under 35 U.S.C. § 371 of International Application No. PCT/JP2019/003688, having an International Filing Date of Feb. 1, 2019, which claims priority to Japanese Application Serial No. 2018-019419, filed on Feb. 6, 2018. The disclosure of the prior application is considered part of the disclosure of this application, and is incorporated in its entirety into this application

TECHNICAL FIELD

The present invention relates to an estimation device, an estimation method, and a program.

BACKGROUND ART

With development of communication networks, communication services (voice communication, video communication, and web) for transmitting various types of content via networks have proliferated. In particular, with advance and progress of web technologies, many various types of content or many web pages including complicated processes are available.

Since communication on networks is performed by segmenting data into packets, there are strong limitations on circuit bandwidths of the networks or there are strong influences of congestion, a packet loss, and the like. Accordingly, a transmission time of the same content varies depending on a network state. The influence of the network state differs depending on content. In general, a network state has a more influence on content including many elements or content of which the number of transmissions based on a result processed by a terminal is larger.

In order to check whether a network service provider provides a web service with good quality, it is important to measure a web waiting time required for an individual user to read a web page and monitor quality of a service provided by a communication network. In order to improve communication service quality, a network service provider can construct efficient equipment by making investment in equipment from an area with relatively poor provision quality. Therefore, a technology for estimating a web waiting time actually experienced by a user in units of areas is required.

In the related art, a navigation timing API (see Non-Patent Literature 1) capable of performing measurement on a terminal has been used to ascertain a web waiting time. In this API, a web waiting time is estimated by acquiring each timing at which a web page is read from a browser.

CITATION LIST

Non-Patent Literature

Non-Patent Literature 1: Navigation Timing, W3C Recommendation, [online], Internet <https://www.w3.org/TR/navigation-timing/>

SUMMARY OF THE INVENTION

Technical Problem

In this method, however, to evaluate a web waiting time, it is necessary to perform measurement at a terminal. Accordingly, in order for a network service provider to ascertain area quality comprehensively, it is necessary to collect a large number of measures, and thus it is difficult to ascertain and check area quality. Since collected measurement values include influences of terminal environments, it is difficult to estimate a web reading waiting time in units of areas.

The present invention is devised in view of the foregoing circumstances and an objective of the present invention is to estimate a display time of a web page from information which can be measured in a network.

Means for Solving the Problem

Accordingly, to solve the foregoing problems, an estimation device includes: a collection unit configured to collect first information that has correlation with a display time of a web page from devices transmitting data in a network; a conversion unit configured to convert the first information into second information per unit time of each area including one of the devices; and a calculation unit configured to calculate an estimated value of the display time in each area in the unit time based on the second information and characteristics of the display time with regard to the first information.

Effects of the Invention

It is possible to estimate a display time of a web page from information which can be measured in a network.

DESCRIPTION OF EMBODIMENTS

Figure 1:
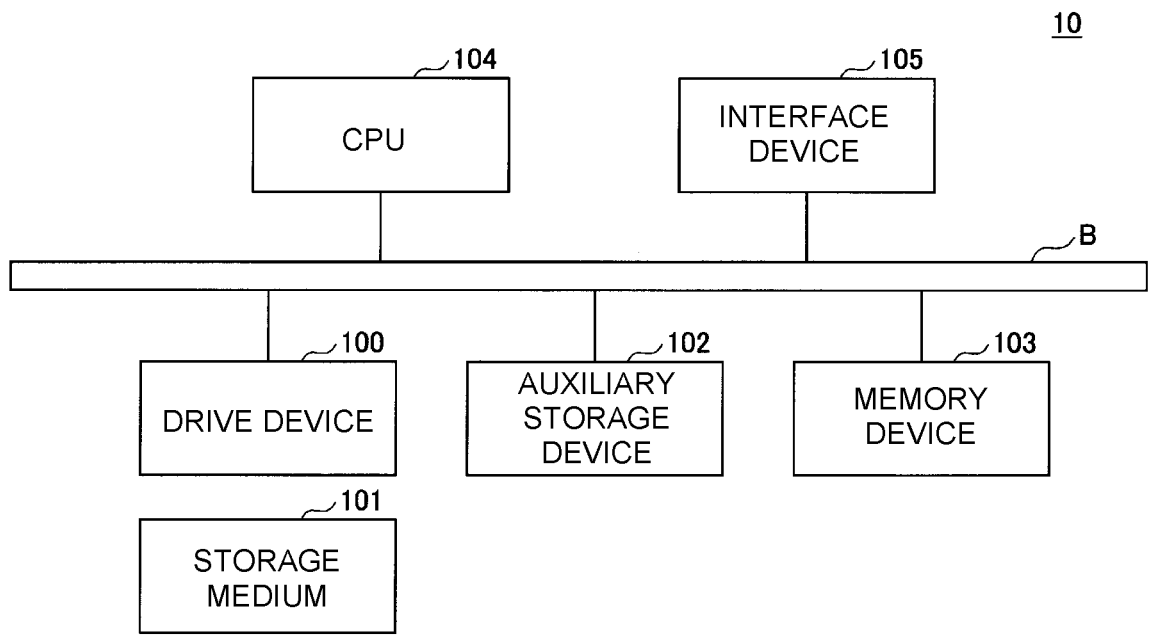
FIG. 1 is a diagram illustrating a hardware configuration example of a quality estimation device 10 according to an embodiment of the present invention.

Hereinafter, an embodiment of the present invention will be described with reference to the drawings. FIG. 1 is a diagram illustrating a hardware configuration example of a quality estimation device 10 according to the embodiment of the present invention. The quality estimation device 10 in FIG. 1 includes a drive device 100, an auxiliary storage device 102, a memory device 103, a CPU 104, and an interface device 105 connected to each other via a bus B.

A program that realizes a process in the quality estimation device 10 is provided by a recording medium 101 such as a CD-ROM. When the recording medium 101 storing the program is set in the drive device 100, the program is installed from the recording medium 101 to the auxiliary storage device 102 via the drive device 100. Here, the program may not necessarily be installed from the recording medium 101 and may be downloaded from another computer via a network. The auxiliary storage device 102 stores the installed program and stores necessary files, data, and the like.

When an instruction to activate a program is given, the memory device 103 reads the program from the auxiliary storage device 102 and stores the program. The CPU 104 performs a function related to the quality estimation device 10 in accordance with the program stored in the memory device 103. The interface device 105 is used as an interface which is connected to a network.

Figure 2:
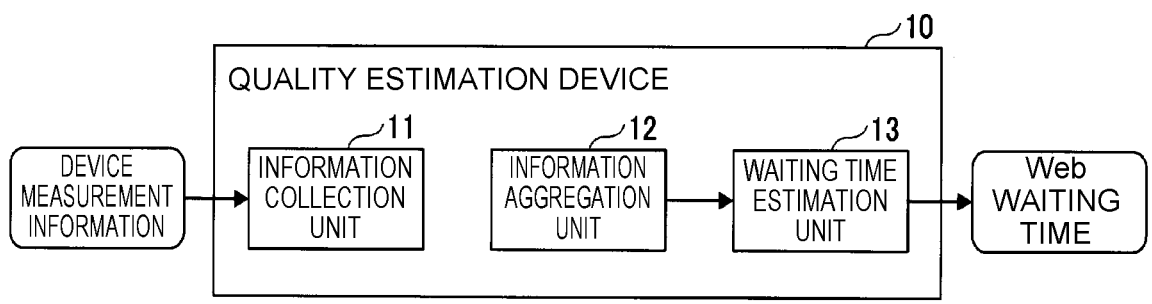
FIG. 2 is a diagram illustrating a functional configuration example of the quality estimation device 10 according to the embodiment of the present invention.

FIG. 2 is a diagram illustrating a functional configuration example of the quality estimation device 10 according to the embodiment of the present invention. In FIG. 2, the quality estimation device 10 includes an information collection unit 11, an information aggregation unit 12, and a waiting time estimation unit 13, or the like. These units are realized through a process which one or more programs installed in the quality estimation device 10 causes the CPU 104 to perform.

The information collection unit 11 collects information that is measured in devices and has correlation with web waiting times (hereinafter referred to as "device measurement information") from some or all of the devices (devices related to transmission of communication data, for example, such as evolved Node B (eNodeB)/eNB which is a wireless base station, terminal devices (terminal facilities) of a fixed network, or routers) in each network of one or more estimation target areas. The device measurement information is, for example, a transmission data amount (throughput) for a given time measured in each device. The web waiting time is a display time of a web page. The display time of the web page is for example, an elapsed time in which an instruction to display a web page is input in a user terminal and then display of the web page is completed or a time in which an instruction to display a web page is input and then download of data necessary to display the web page is completed. Any timing may be determined as an ending time of the display time, as desired.

The estimation target area may be a device in management units of networks or a specific grade or less or may be units of devices, or the number or devices or an area in a plurality of estimation target areas may differ.

The information aggregation unit 12 converts the device measurement information collected by the information collection unit 11 into information in a unit time (one second, one minute, one hour, or the like) in each estimation target area (hereinafter referred to as an "aggregation time") (hereinafter referred to as "area measurement information"). For example, when the device measurement information is a transmission data amount (throughput), the device measurement information is converted into an average throughput per unit time.

At the time of conversion, for each estimation target area, an arithmetic mean of the number of devices of a device group related to collection of the device measurement information among devices included (belonging to) in the estimation target area or a weighted mean such as a person capacity of each device of the device group or an area capacity of each device of the device group may be considered as area measurement information of the estimation target area. When the device measurement information is information for a period shorter than an aggregation time, the device measurement information may be converted into area measurement information, for example, by arithmetic mean using the aggregation time as a criterion. When the device measurement information is information for a period longer than the aggregation time, the area measurement information per aggregation time may be calculated through interpolation using information regarding times before and after a collection period of the device measurement information, for example, by using the aggregation time as a criterion.

The waiting time estimation unit 13 estimates a web waiting time corresponding to the aggregation time (under a network situation in the aggregation time) in each estimation target area using the area measurement information per aggregation time calculated for each estimation target area by the information aggregation unit 12. For example, the waiting time estimation unit 13 performs estimation based on characteristics (for example, a logarithm or a logistic function) in which a web waiting time (W) increases with a decrease in an average throughput (T) of the estimation target area. In this case, the average throughput (T) is equivalent to the area measurement information per aggregation time and the waiting time estimation unit 13 calculates an estimated value of the web waiting time based on Expression 1 or 2 below.

$$W = a + b \times T^c / (1+T) \quad \text{Expression 1:}$$

$$W = a + (1-a) \times T^c / (1+T) \quad \text{Expression 2:}$$

where, a, b, and c are predetermined coefficients. These coefficients may be determined for each piece of content or each URI of a web page or one set of values may be determined on the assumption of representative web content.

Expressions 1 and 2 are merely exemplary. An estimated value of the web waiting time may be calculated based on other expressions when these expressions are expression conforming to characteristics in which a web waiting time decreases with an increase in a throughput.

Apart from a throughput (T) or in addition to the throughput (T), a web waiting time may be estimated using any of information associated with transmission of data of each device such as the number of users accommodated in each estimation target area, the number of resources of a device (for example, a data amount which can be transmitted per given time), a number of resources used or usage rate, transmission power, information regarding connection quality (the number of connection successes) of a network reported to a base station, an accommodation station, or the like by a user terminal, and information regarding transmission quality (throughput, delay, or the like) (for example, a channel quality indicator (CQI)). In this case, the information collection unit 11 may collect information to be used. A conversion unit may convert the information. The waiting time estimation unit 13 may calculate an estimated value of web waiting time using an expression that considers one or both of characteristics (1) in which a web waiting time decreases with an increase in a throughput or the number of resources and characteristics (2) in which a web waiting time increases with an increase in the number of accommodated users (the number of connected users), a number of resources used, or a resource usage rate, instead of Expression 1 or 2.

Figure 3:
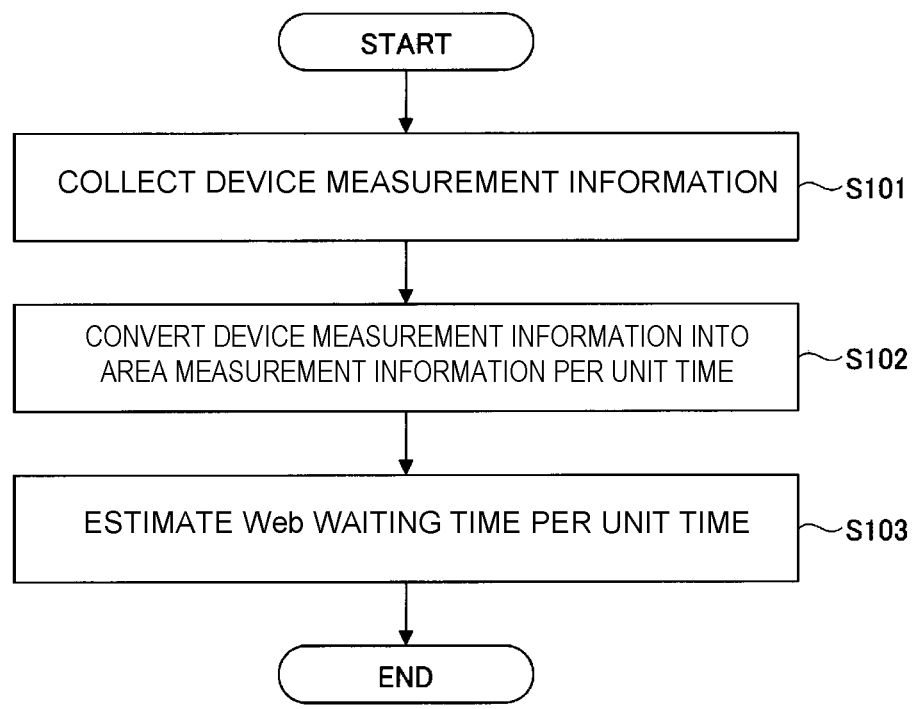
FIG. 3 is a flowchart illustrating an example of a processing procedure performed by the quality estimation device 10.

Hereinafter, a processing procedure performed by the quality estimation device 10 will be described. FIG. 3 is a flowchart illustrating an example of a processing procedure performed by the quality estimation device 10.

In step S101, the information collection unit 11 collects device measurement information from some or all of the devices in a network of the estimation target area for each estimation target area.

Subsequently, the information aggregation unit 12 converts the device measurement information collected from devices belonging to the estimation target area into the area measurement information per aggregation time for each estimation target area (S102).

Subsequently, the waiting time estimation unit 13 calculates an estimated value of the web waiting time per aggregation time based on the area measurement information (S103).

The processing procedure of FIG. 3 may be performed periodically.

As described above, according to the embodiment, a web waiting time can be estimated from information which can be measured in a network. As a result, a web waiting time of any estimation target area can be estimated without measuring a web waiting time using a terminal that displays a web page.

Accordingly, while a web waiting time cannot be estimated in a large scale in the related art, according to the embodiment, quality of a web service provided to any estimation target area can be monitored and managed, and thus it is possible to achieve an improvement in area quality.

In the embodiment, the quality estimation device 10 is an example of an estimation device or a computer. The information collection unit 11 is an example of a collection unit. The information aggregation unit 12 is an example of a conversion unit. The waiting time estimation unit 13 is an example of a calculation unit. The device measurement information is an example of first information. The area measurement information is an example of second information.

While preferred embodiments of the invention have been described in detail, it should be understood that these are exemplary of the invention and are not to be considered as limiting. Various substitutions and modifications can be made within the scope of the gist of the present invention described in the claims.

REFERENCE SIGNS LIST

10 Quality estimation device
11 Information collection unit
12 Information aggregation unit
13 Waiting time estimation unit
100 Drive device
101 Recording medium
102 Auxiliary storage device
103 Memory device
104 CPU
105 Interface device
B Bus

The invention claimed is:

1. An estimation device, implemented by one or more computers, comprising:
one or more processors; and
at least one computer memory storing instructions that, when executed by the one or more processors, cause the one or more processors to perform operations comprising:
collecting, from one or more devices transmitting data in a network, first information that has correlation with a display time of a web page measured in each of the one or more devices;
converting the first information into second information per a unit time that is a predefined time interval; and
calculating an estimated value of the display time in each of estimation target areas including the one or more devices per the unit time based on the second information and characteristics of the display time with regard to the first information, the characteristics of the display time in which the display time increases with a decrease in an average throughput of an estimation target area,
wherein converting the first information into the second information comprises:
based on a collection time period of the first information being shorter than the unit time, converting the first information into the second information using the unit time as a criterion, and
based on the collection time period of the first information being longer than the unit time, calculating the second information per the unit time using information regarding times before and after the collection time period of the first information.

2. The estimation device according to claim 1, wherein:
the first information is a number of resources of the network or a throughput,
the second information is a number of resources per the unit time or a throughput per the unit time, and
the one or more processors are configured to calculate the estimated value based on characteristics in which the display time increases with a decrease in the number of resources or the throughput and at least one of the number of resources or the throughput per the unit time.

3. The estimation device according to claim 1, wherein:
the first information is a resource usage rate of the network or a number of connected users,
the second information is a resource usage rate per the unit time or a number of connected users per the unit time, and
the one or more processors are configured to calculate the estimated value based on characteristics in which the display time increases with an increase in the number of connected users or the resource usage rate and at least one of the resource usage rate per the unit time or the number of connected users per the unit time.

4. The estimation device according to claim 1, wherein the second information is an arithmetic mean of a number of devices of a device group related to collecting the first information among the one or more devices.

5. The estimation device according to claim 1, wherein the second information is a weighted mean such as (i) a person capacity of each device of a device group related to collecting the first information or (ii) an area capacity of each device of the device group.

6. The estimation device according to claim 1, wherein the first information includes a number of users accommodated in the network, a number of resources of the one or more devices, a number of resources used or usage rate, transmission power, information regarding connection quality of the network, an accommodation station, and information regarding transmission quality.

7. An estimation method causing a computer to perform:
a collection procedure of collecting, from one or more devices transmitting data in a network, first information that has correlation with a display time of a web page measured in each of the one or more devices;
a conversion procedure of converting the first information into second information per a unit time that is a predefined time interval; and
a calculation procedure of calculating an estimated value of the display time in each of estimation target areas including the one or more devices per the unit time based on the second information and characteristics of the display time with regard to the first information, the characteristics of the display time in which the display time increases with a decrease in an average throughput of an estimation target area, wherein the conversion procedure further includes:
based on a collection time period of the first information being shorter than the unit time, converting the first information into the second information using the unit time as a criterion, and
based on the collection time period of the first information being longer than the unit time, calculating the second information per the unit time using information regarding times before and after the collection time period of the first information.

8. The estimation method according to claim 7, wherein:
the first information is a number of resources of the network or a throughput,
the second information is a number of resources per the unit time or a throughput per the unit time, and
in the calculation procedure, the estimated value is calculated based on characteristics in which the display time increases with a decrease in the number of resources or the throughput and at least one of the number of resources or the throughput per the unit time.

9. The estimation method according to claim 7, wherein:
the first information is a resource usage rate of the network or a number of connected users,
the second information is a resource usage rate per the unit time or a number of connected users per the unit time, and
in the calculation procedure, the estimated value is calculated based on characteristics in which the display time increases with an increase in the number of connected users or the resource usage rate and at least one of the resource usage rate per the unit time or the number of connected users per the unit time.

10. The estimation method according to claim 7, wherein the second information is an arithmetic mean of a number of devices of a device group related to collecting the first information among the one or more devices.

11. The estimation method according to claim 7, wherein the second information is a weighted mean such as (i) a person capacity of each device of a device group related to collecting the first information or (ii) an area capacity of each device of the device group.

12. The estimation method according to claim 7, wherein the first information includes a number of users accommodated in the network, a number of resources of the one or more devices, a number of resources used or usage rate, transmission power, information regarding connection quality of the network, an accommodation station, and information regarding transmission quality.

13. A non-transitory recording medium storing a program, wherein execution of the program causes one or more computers to perform operations comprising:
collecting, from one or more devices transmitting data in a network, first information that has correlation with a display time of a web page measured in each of the one or more devices;
converting the first information into second information per an unit time that is a predefined time interval; and
calculating an estimated value of the display time in each of estimation target areas including the one or more devices per the unit time based on the second information and characteristics of the display time with regard to the first information, the characteristics of the display time in which the display time increases with a decrease in an average throughput of an estimation target area, wherein converting the first information into the second information further includes:
based on a collection time period of the first information being shorter than the unit time, converting the first information into the second information using the unit time as a criterion, and
based on the collection time period of the first information being longer than the unit time, calculating the second information per the unit time using information regarding times before and after the collection time period of the first information.

14. The non-transitory recording medium according to claim 13, wherein:
the first information is a number of resources of the network or a throughput,
the second information is a number of resources per the unit time or a throughput per the unit time, and
calculating the estimated value comprises calculating the estimated value based on characteristics in which the display time increases with a decrease in the number of resources or the throughput and at least one of the number of resources or the throughput per the unit time.

15. The non-transitory recording medium according to claim 13, wherein:
the first information is a resource usage rate of the network or a number of connected users,
the second information is the resource usage rate per the unit time or the number of connected users per the unit time, and
calculating the estimated value comprises calculating the estimated value based on characteristics in which the display time increases with an increase in the number of connected users or the resource usage rate and at least one of the resource usage rate per the unit time or the number of connected users per the unit time.

16. The non-transitory recording medium according to claim 13, wherein the second information is an arithmetic mean of a number of devices of a device group related to collecting the first information among the one or more devices.

17. The non-transitory recording medium according to claim 13, wherein the second information is a weighted mean such as (i) a person capacity of each device of a device group related to collecting the first information or (ii) an area capacity of each device of the device group.

18. The non-transitory recording medium according to claim 13, wherein the first information includes a number of users accommodated in the network, a number of resources of the one or more devices, a number of resources used or usage rate, transmission power, information regarding connection quality of the network, an accommodation station, and information regarding transmission quality.

* * * * *